United States Patent [19]

Sims, Jr.

[11] 4,389,689

[45] Jun. 21, 1983

[54] METHOD AND APPARATUS FOR MOUNTING MAGNETIC TAPE HEADS

[75] Inventor: Dewey M. Sims, Jr., Wayne, Mich.

[73] Assignee: Northern Telecom Systems Corporation, Ann Arbor, Mich.

[21] Appl. No.: 180,841

[22] Filed: Aug. 25, 1980

[51] Int. Cl.³ .......................................... G11B 21/24
[52] U.S. Cl. ................................................... 360/109
[58] Field of Search ......................... 360/109, 104–106

[56] References Cited

U.S. PATENT DOCUMENTS

| | | | |
|---|---|---|---|
| 2,861,134 | 11/1958 | Gernert | 360/109 |
| 3,833,925 | 9/1974 | Jenkins | 360/105 |
| 3,978,522 | 8/1976 | Rothlisberger et al. | 360/104 |
| 4,086,638 | 4/1978 | Saito | 360/109 |
| 4,158,868 | 6/1979 | Jenkins | 360/109 |
| 4,275,427 | 6/1981 | Bjordahl | 360/109 |

*Primary Examiner*—Alfred H. Eddleman

*Attorney, Agent, or Firm*—Price, Heneveld, Huizenga & Cooper

[57] ABSTRACT

An arrangement for mounting magnetic tape heads in magnetic tape players, recorders, and other similar machines, comprises a mounting plate shaped for fixedly connecting a tape head therewith. A housing portion of the machine includes a base on which the mounting plate is pivotally supported for side-to-side, i.e., pivotal, movement, and housing sidewalls between which the side edges of the mounting plate are received. An adjustment mechanism is provided to selectively pivot the mounting plate into an aligned position, wherein the magnetic recording "gaps" of the tape head are in a substantially perpendicular relationship with the direction of motion of a magnetic tape sliding thereover. Channels are disposed along the mounting plate side edges and the adjacent housing sidewalls, and a solidifying plastic material is injected therein to form keys which positively retain the tape head in the aligned position.

27 Claims, 7 Drawing Figures

METHOD AND APPARATUS FOR MOUNTING MAGNETIC TAPE HEADS

BACKGROUND OF THE INVENTION

The present invention relates to magnetic tape recording heads, and in particular to a procedure, and structure, for accurately and permanently mounting the same for very precise operation in high-density digital recorder applications of a nature used in computer peripherals, data terminals, and other similar machines.

Magnetic tape heads or pickups are used in conjunction with a wide variety of tape machines, such as audio players/recorders, video players/recorders, tape drive units for computers, and the like. In all such devices it is important that the tape head be properly aligned with the magnetic tape during use to insure error-free interchange. However, tape-to-head alignment becomes most important in digital applications, since here each recorded "bit" is represented by a single upright flux transition on the tape, which may be misread or even skipped if head alignment is not precisely correct. The development of magnetic tape devices for digital data recording applications has led to various arrangements for increasing the number of bits or units of code recorded per inch of tape, to reduce size and cost. Wider tapes are sometimes used to accept multiple tracks of recorded data, thereby obtaining an increased recording density per unit length. Additionally, the "packing density" is continually increased in each recorded track, thus making each flux transition narrower and closer to one another in each track. As a result, the alignment between the magnetic head and the tape has become increasingly more critical, particularly with respect to the acceptable tolerance of the "azimuth angle", which is measured between the vertical axis of the head and any line perpendicular to the axis of motion of a tape sliding thereover. As an example, some installations require that the total accumulated azimuth angle tolerance not exceed $\pm 0° 3'$.

One known arrangement for aligning a magnetic tape head within a tape machine is illustrated in FIG. 1 of the drawings, wherein a tape head 100 is fixed in a housing portion 101 of the machine by a surrounding "potting" material 102. The tape head 100 is preferably dynamically aligned with the tape by using means such as a master tape which is known to have perfectly-located and aligned pre-recorded bits. That is, the master tape is inserted into the tape player in the read or play mode and an oscilloscope or other similar readout device is connected with the tape machine to indicate when the head 1 has been brought into perfect alignment with the bits on the master tape cartridge. The head 100 is then pivoted within housing 101 until the azimuth angle is within an acceptable tolerance. After the head 100 has been accurately located, it is fixed in position within the housing 101, typically with an epoxy-type of potting material. However, since the potting material shrinks as it hardens, and is not of uniform thickness around the head, the pre-set azimuth angle is inevitably altered as the potting material cures.

Another known arrangement for mounting a magnetic tape head is shown in FIG. 2 of the drawings, wherein tape head 100 is attached to a plate 105. The plate 105 is centrally supported on a rib portion 106 of the housing 101 for pivotal motion thereon. A pair of set screws 107 engage opposite sides of the mounting plate 105, and are adjusted to pivot the plate and tape head 100 into alignment with the master tape passing thereacross, as described hereinabove. After the correct azimuth angle has been achieved, a potting compound is inserted between the plate 105 and the bottom of the housing 101 on both sides of rib 106 to permanently hold the head in place. At best, the dual set screw arrangement of the prior art arrangement shown in FIG. 2 is considered to be somewhat unwieldly to adjust, and it is also inherently inaccurate. Further, by pottong one side of the mounting device at a time, uneven shrinkage of the potting material causes the tape head 100 to move out of the aligned position. This problem is particularly exacerbated when two-part potting compounds are used, as the potting material begins to harden immediately after it is mixed.

SUMMARY OF THE INVENTION

One aspect of the present invention is to provide an arrangement for mounting magnetic tape heads and the like, comprising a mounting plate adapted to fixedly attach a magnetic tape head therewith. A housing is provided with a base and first and second upstanding sidewalls, between which the side edges of the base are received. The mounting plate is pivotally supported on the base of the housing to permit pivotal motion thereon, and means are provided for adjusting the angular orientation of the mounting plate to establish a predetermined relationship between the head and the plane of motion of a magnetic tape sliding thereover. A pair of channels are positioned in the mounting plate side edges and the adjacent sidewalls of the housing, and extend therealong to one end of at least one of the plate and housing members. A solidifying plastic material is injected into the channels, and is cured to form first and second keys which positively and permanently interconnect the mounting plate and the housing is an aligned position.

Another aspect of the present invention is to provide a mechanism for accurately pivoting a tape head into a position wherein the same is aligned with magnetic tapes which slide thereover. The apparatus includes a mounting plate pivotally supported in a housing for seesaw-type motion. A resilient member engages one side of the mounting plate to pivotally urge the plate in one direction, and an adjustable stop engages the other side of the mounting plate to retain the head in a preselected position. The resilient means preferably comprises a leaf spring, which applies a substantially constant force to the associated side of the mounting plate, and simultaneously retains the plate in lateral alignment in the housing.

The principal objects of the present invention are: to provide an improved mounting arrangement for magnetic tape heads and the like, which positively and permanently retains the tape head in an aligned position with the plane of motion of the tapes which are used in the machine; to provide a mounting arrangement which includes a pivotally supported mounting plate with a resilient means and an adjustable stop engaging opposing sides of the plate to easily and accurately adjust the azimuth angle of the tape head; to provide a mounting arrangement which will not move from the aligned position once it has been set in place; to provide a mounting arrangement with a single set screw design which is easily adjusted to accommodate very close azimuth angle tolerances; and to provide a mounting arrangement which is efficient in use, economical to manufacture, capable of a long operating life, and particularly well adapted for the proposed use.

These and many other important features, advantages, and objects of the present invention will be further understood and appreciated by those skilled in the art by reference to the following written specification, claims, and appended drawings.

DETAILED DESCRIPTION OF THE PREFERRED EMBODIMENTS

Figure 4:
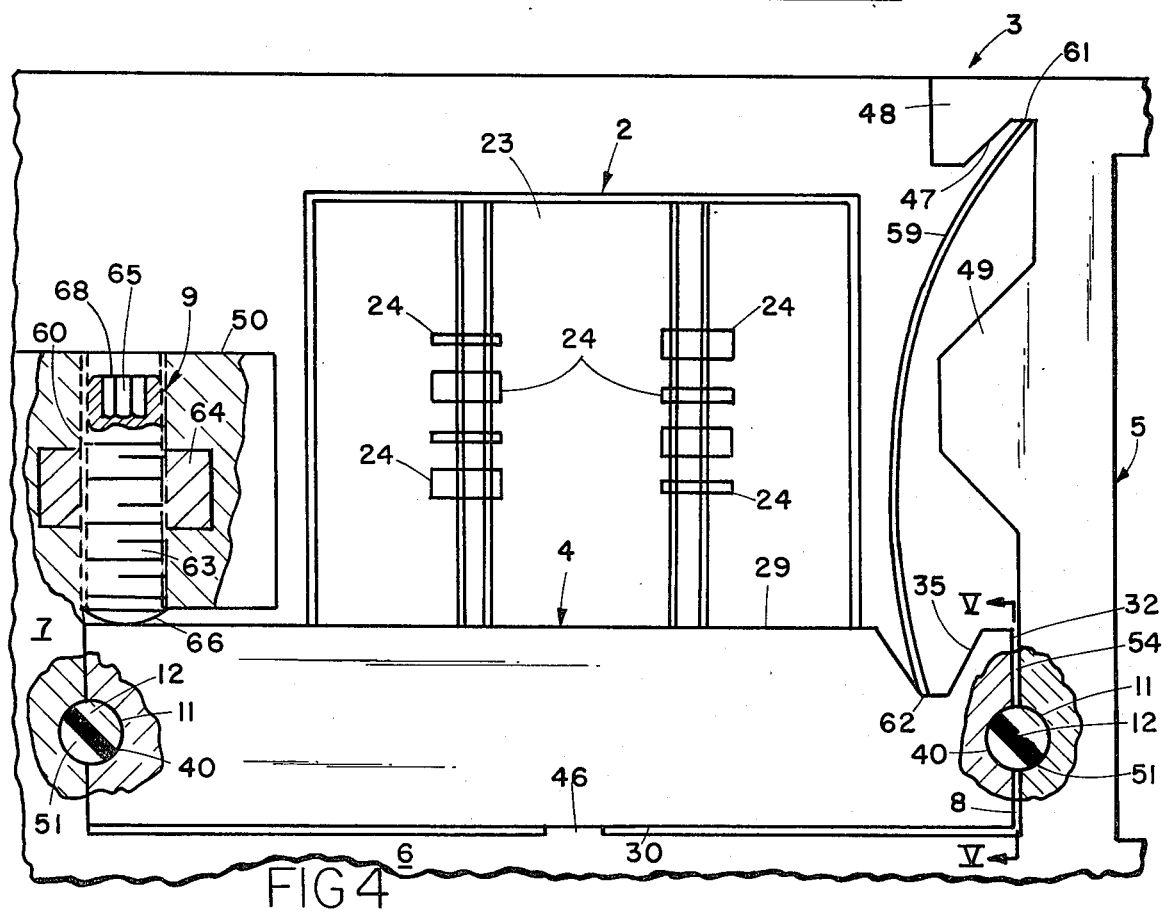
FIG. 4 is an enlarged, fragmentary, front elevational view of the tape head mounting arrangement, with portions thereof broken away to reveal internal construction.

For purposes of description herein, the terms "upper", "lower", "right", "left", "rear", "front", "vertical", "horizontal", and derivatives thereof shall relate to the invention as oriented in FIG. 4. However, it is to be understood that the invention may assume various alternative orientations, except where expressly specified to the contrary.

Figure 1:
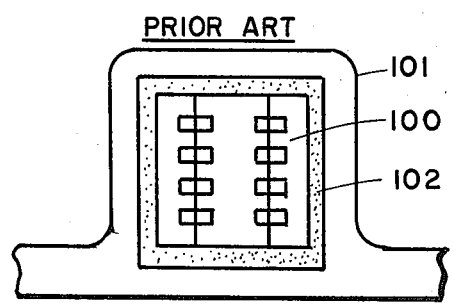
FIG. 1 is a fragmentary, front elevational view of a first, prior art mounting arrangement.
Figure 2:
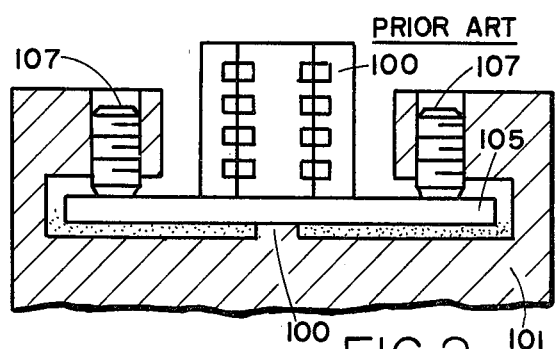
FIG. 2 is a fragmentary, vertical cross-sectional view of a second, prior art mounting arrangement.
Figure 3:
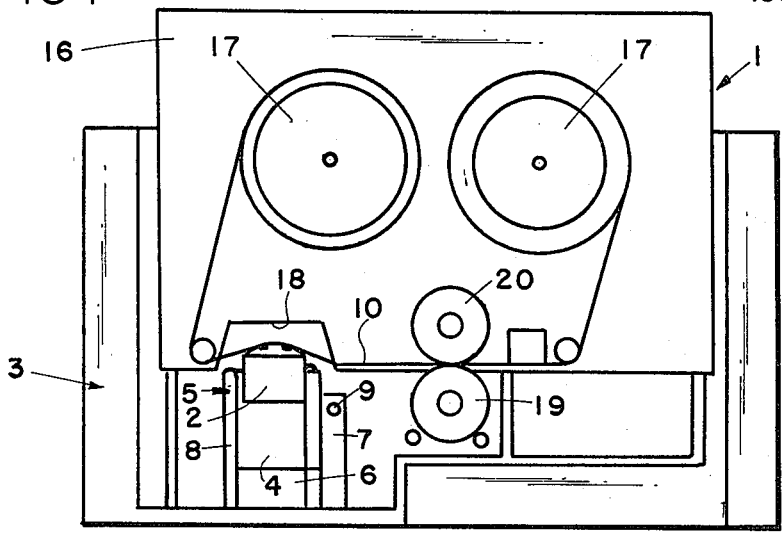
FIG. 3 is a top plan view of a mounting arrangement embodying the present invention, shown in conjunction with a tape transport with a cassette tape mounted therein.

The reference numeral 1 (FIG. 3) generally designates an arrangement embodying the present invention for mounting a magnetic tape head 2 in a tape drive 3. The arrangement 1 comprises a mounting plate 4 having the tape head 2 fixedly connected therewith. A housing portion 5 of tape drive 3 includes a base 6 on which mounting plate 4 is pivotally supported, and housing sidewalls 7 and 8 between which the side edges of mounting plate 4 are received. An adjustment mechanism 9 is provided to selectively pivot mounting plate 4, and thereby position tape head 2 in a substantially perpendicular relationship with the plane of motion of a magnetic tape 10 which slides thereover. Channels 11 (FIG. 4) are disposed along the mounting plate side edges and the adjacent housing sidewalls 7 and 8, and a solidifying plastic material is injected into the channels to form keys 12 which positively retain the tape head 2 in the aligned position.

The illustrated tape drive 3 is particularly well-adapted for use, with the illustrated tape cassette, as a read/write magnetic tape memory unit, such as those used in small or mini-computer applications for data storage. The tape drive 3 is adapted to receive a cassette tape cartridge 16 therein, which includes a pair of reels 17 onto which magnetic tape 10 is wound, and a window or access opening 18 which is aligned with tape head 2, and which exposes the tape thereto during operation. The tape drive 3 includes a drive wheel 19 which cooperates with an idler wheel 20 mounted in the cassette 16, between which tape 10 is entrained and gripped ("pinched") so as to be frictionally engaged and driven past the magnetic head 2.

Figure 5:
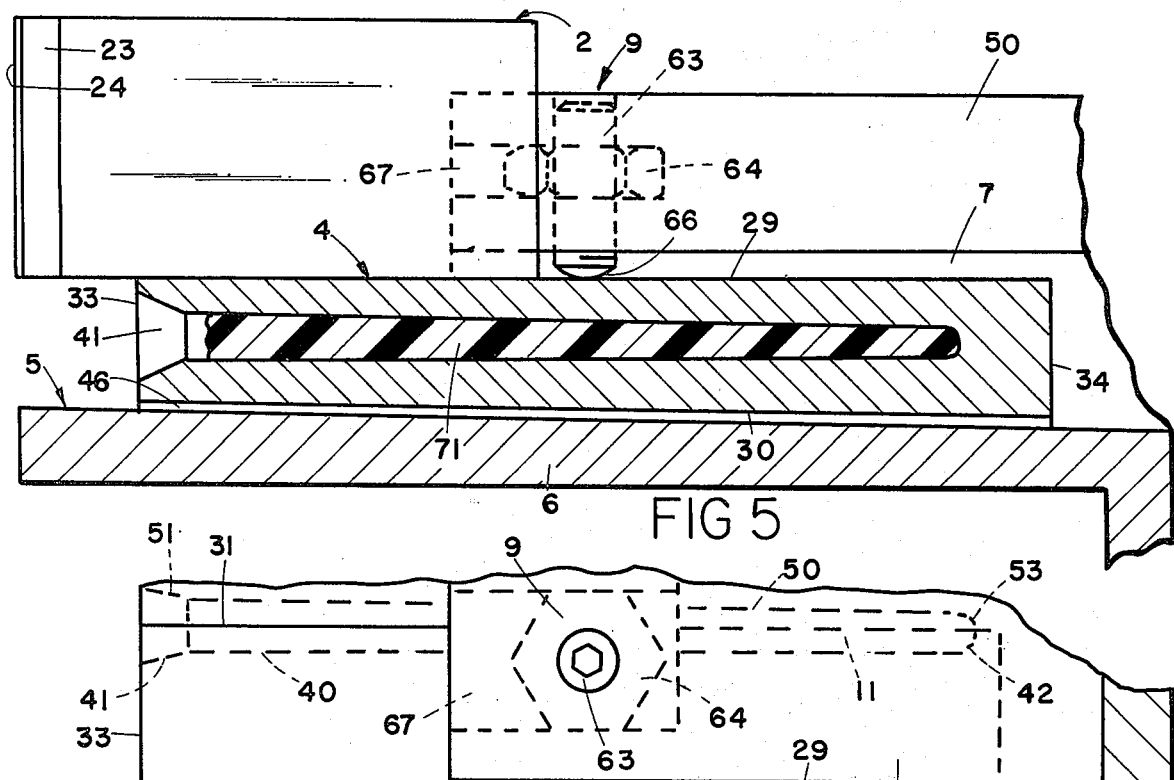
FIG. 5 is an enlarged, fragmentary, vertical cross-sectional view of the tape head mounting arrangement, taken along the line V—V, FIG. 4, with a leaf spring portion removed.
Figure 6:
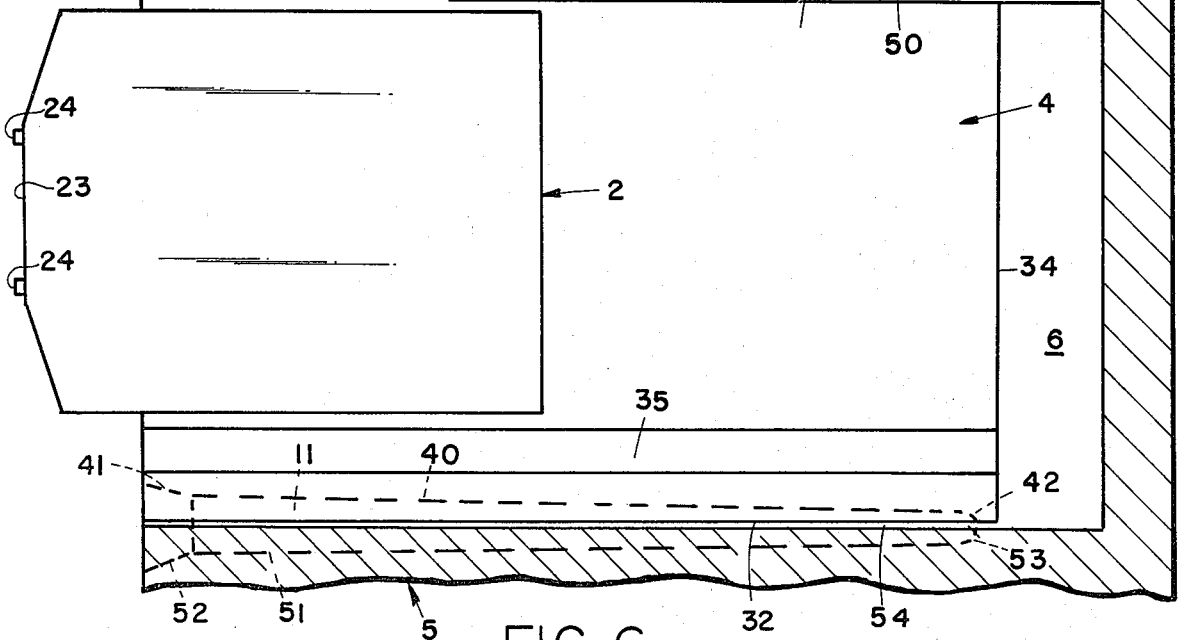
FIG. 6 is an enlarged, fragmentary, top plan view of the tape head mounting arrangement, with portions thereof broken away and/or removed for purposes of illustration.

The illustrated tape head 2 is of a conventional construction, and includes a trapezoidally-shaped forward end or face 23 having a plurality of magnetic pole pieces 24 which are adapted to abuttingly engage the magnetic tape 10 as it slides thereover, and either reproduce magnetic transitions ("read") from the tape or record transitions ("write") thereon. As best illustrated in FIGS. 5 and 6, the forward end 23 of tape head 2 projects outwardly from the forwardmost edge of mounting plate 4, and the head is positioned along a medial portion of the mounting plate. In this example, tape head 2 is a four track, $\frac{1}{4}$-inch drive unit, and is electrically connected with an amplifier circuit (not shown) of the tape machine 3.

The illustrated mounting plate 4 (FIG. 4) comprises a rectangular sheet, or plate, of rigid material, having a substantially rectangularly-shaped transvese cross section, with upper and lower surfaces 29 and 30 which are substantially flat and mutually parallel. Mounting plate 4 also includes a pair of opposing side edges 31 and 32, and forward and rearward end edges 33 and 34 (FIGS. 5 and 6), respectively. The tape head 1 is fixedly attached to the upper surface 29 of the mounting plate 4 by a suitable fastener, such as bolts, adhesive, or the like, and pivots therewith with respect to housing 5. A groove or notch 35 extends longitudinally in the top surface of mounting plate 4 (FIG. 4), for purposes to be described hereinafter.

Both of the mounting plate side edges 31 and 32 include an aperture which forms a portion of the channels 11. As best illustrated in FIGS. 5 and 6, in this example, an elongate aperture or groove 40 extends along a major portion of the mounting plate side edges 31 and 32 at a central portion thereof. The illustrated grooves 40 have an open end 41 at the forward edge 33 of the mounting plate, and taper inwardly therefrom to a closed end 42 which is spaced inwardly from the rearward edge 34 of the mounting plate. The open end 41 of groove 40 is enlarged, and the groove preferably has a semi-frustoconical shape to facilitate insertion of an injecting mechanism therein. The remaining portion of the groove 40 is substantially semi-cylindrical in shape, with the aforementioned taper toward the closed end of the groove.

The housing 5 is fixed with respect to the plane of motion of the tape 10, and is adapted to pivotally mount the plate 4 and tape head 2 therein. As best illustrated in FIG. 4, a rib 46 is disposed between mounting plate 4 and the base 6 of housing 5, and extends longitudinally along a medial portion thereof to form a fulcrum on which the mounting plate pivots. In this example, rib 46 is formed integrally with the housing base 6. However, it is to be understood that it may be connected with either the housing base or the bottom of the mounting plate 4. The right-hand housing sidewall 8 (as viewed in FIG. 4) extends upwardly from the housing base 6, and includes a notch 47 formed along the upper edge 48 thereof for purposes to be described in greater detail hereinafter. Also, a trapezoidally-shaped lug 49 extends outwardly from the right-hand sidewall 8 at a medial portion thereof toward the tape head 2. The left-hand housing sidewall 7 (as viewed in FIG. 4) also extends upwardly from housing base 6, and includes an inwardly-projecting flange 50 which forms a slot with the base of the housing in which the left-hand side edge of mounting plate 4 is received. The adjustment mechanism 9, which is described below, is mounted in flange 50, and engages the upper surface of mounting plate 4.

Grooves 51 (FIGS. 4 and 6) extend longitudinally along the inside surface of the housing sidewalls 7 and 8 adjacent mounting plate 4 to form the corresponding half of the channels 11. The illustrated grooves 51 are substantially identical in shape to the mounting plate grooves 40, and include an enlarged, semi-fustoconical open end 52 at the forward edge of the housing, and a closed end 53 disposed inwardly of the rearwardmost portion of the housing. Groove 51 is also substantially semi-cylindrical in shape, and is tapered inwardly toward the rear of the groove. The mounting plate side edges 31 and 32 are spaced apart a distance which is smaller than the distance between the inside surfaces of housing sidewalls 7 and 8, respectively, so as to form a slight gap 54 therebetween on the right-hand side of the mounting plate. The gap 54 is sufficiently wide to permit the mounting plate 4 to shift laterally in housing 5, and to pivot from side-to-side in a seesaw fashion on rib 46 as a fulcrum. Further, gap 54 allows the air in the channels 11 to exhaust therethrough during the injection of the plastic potting material.

The adjustment means 9 (FIG. 4) comprises resilient means 59 which engages one side of mounting plate 4 and urges the same rotatably about rib 46 in one direction, and an adjustable stop 60 which engages the other side of the mounting plate and retains the plate in a selected position against the biasing force of the resilient means 59. Resilient means 59 preferably comprises a leaf spring, constructed of spring-steel, and having upper and lower ends 61 and 62, respectively, received and retained in notches 47 and 35. The leaf spring 59 is bowed outwardly away from the notched housing sidewall 8, and lug 49 insures that the leaf spring is installed in the outwardly-bowed orientation. The leaf spring provides a substantially constant force which acts on the right-hand side of mounting plate 4, and attempts to rotate the same in a clockwise direction (as viewed in FIG. 4). The spring notches 47 and 35 are vertically non-aligned, with notch 35 closer to the tape head 2 than notch 47. As a result, the outwardly-bowed leaf spring 59 also urges mounting plate 4 laterally to the left (as viewed in FIG. 4), so that mounting plate side edge 31 and housing sidewall 7 normally assume an abutting relationship, and thereby laterally locate the tape head in the housing. These abutting surfaces are precisely formed to provide an accurate lateral datum or reference plane for positioning the tape head.

The adjustable stop 60 comprises a threaded stud or set screw 63 which is threadedly-mounted in a nut 64 located in housing flange 50. The upper end 65 of the set screw is adapted to receive a tool therein, such as a hex-socket wrench to rotate the same, and is recessed into the upper surface of housing flange 50 so that a tamper-proof seal may be applied to the set screw after it has been adjusted. The lower end 66 of the set screw is arcuately-shaped to abut the upper surface of mounting plate 4 with substantial point contact. As best illustrated in FIGS. 5 and 6, nut 64 is telescopingly received in a slot 67 formed through the forwardmost surface of the housing flange 50, which anchors the nut by preventing rotation of the nut.

After adjustment of mounting plate 4 by means of the set screw 63 in the aforementioned manner, a solidifying, plastic potting material or compound is injected into both of the channels 11. The potting material preferably has a low viscosity, a slow cure, and low shrinkage, such as the two part epoxy-type material known in the trade as "Sty Cast".

In use, the mounting plate 4, with tape head 2 fixedly attached thereto, is initially inserted into housing 5, such that the bottom 30 of the mounting plate abuts the upper surface of rib 46, and the opposing plate side edges 31 and 32 are received between the sidewalls 7 and 8 of the housing. The leaf spring 59 is then bowed and placed into position, with its ends entrapped within the notches 47 and 35 of the housing and mounting plate 4. The lateral component of the spring force shifts the mounting plate side edge 31 into abutment with the adjacent housing sidewall 7 to horizontally align or index the tape head in the housing. The tape head 2 is then electrically connected with an oscilloscope or other readout mechanism, and a master tape 16 is inserted into the tape drive 3. With tape 16 running, i.e., driven by the transport mechanism, the azimuth angle of tape head 2 is adjusted by rotating set screw 63 to a position wherein the readout is maximized, indicating that the axis of the head pole pieces ("gaps") 24 are oriented substantially parallel to the flux transitions recorded on the tape, and perpendicular with the plane of motion of the master tape moving over the ends of the pole pieces. The adjustment mechanism 9 temporarily holds the mounting plate and head assembly in the desired, aligned position in the housing with respect to the tape. A sealing material 68 (FIG. 4) may then be placed in the housing recess above set screw 63 to hold the set screw in position, and to form a tamper-proof seal thereover.

However, to insure that the tape head 2 remains permanently aligned in the tape housing, the mounting plate is fixedly connected with the housing in the following manner. The solidifying, plastic potting material, as noted above, is injected into both of the channels 11, and is cured in place to form first and second keys 70 and 71 (FIGS. 4 and 5) which are substantially rigid and serve to positively interconnect the mounting plate 4 and the housing 5 in the aligned position. The plastic material may comprise substantially any type of flowable media which hardens into a substantially rigid member when cured, epoxy resin or the like being widely-used for such purposes.

Figure 7:
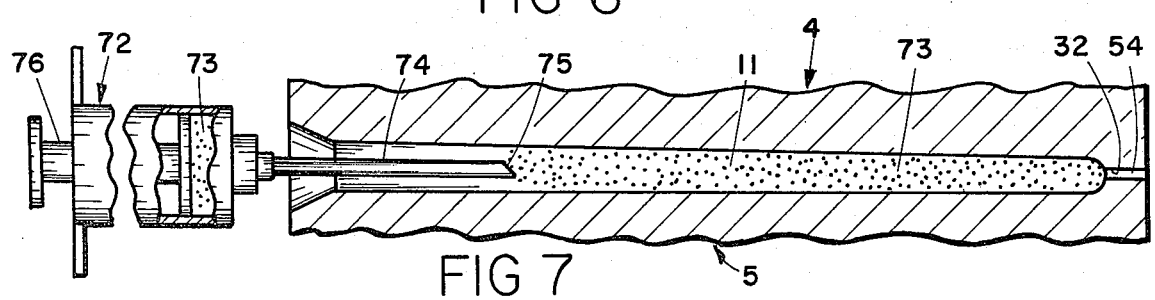
FIG. 7 is an enlarged, fragmentary, cross-sectional view of the tape head mounting arrangement, particularly showing a channel portion thereof being injected with a plastic potting material.

As best illustrated in FIG. 7, the plastic potting material is preferably injected into the channels 11 by means such as the illustrated syringe 72, into which the plastic material 73 is loaded after being mixed. The needle portion 74 of syringe 72 is inserted through the open index of the channels 11 to a point wherein the exit orifice 75 of syringe needle 74 is located about halfway down the channel. Since the open ends of channels 11 are oriented forwardly, the syringe 72 can be freely manipulated in the tape cassette recess area of the machine and thus has easy access to the channels. The syringe plunger 76 is then manipulated to eject the potting material 73 from the needle, whereby the plastic material flows down to the closed end of the channels and fills the same. The space or gap 54 between the side surfaces of the mounting plate and housing sidewalls allows any air trapped in the channels 11 to escape, such that the plastic material will flow smoothly down to the ends of the channel, and form solid keys 70 and 71 without air bubbles captured therein.

A major portion of the channels 11 should be filled with the plastic potting materials; however, it is not necessary that the channels be filled all the way to the open end. It has been determined that when channels 11 are 80% filled there is sufficient key surface to securely retain the mounting plate in position. The left and right-hand channels may be sequentially filled without causing appreciable disturbing forces to be applied to the mounting plate as a result of uneven shrinkage, since the shrinkage forces are oriented so as to not oppose the positioning forces, i.e., primarily acting along or in alignment with the axes of the channels 11. The plastic material is then cured by means such as air drying, until it solidifies into a solid state. Since the potting material sets up from the closed end to the open end of the channels, and because the channels are disposed along a lateral axis, the shrinkage of the potting material as it dries does not substantially affect the precisely-aligned position of the tape head.

The channel and key interlock arrangement of the present invention positively and permanently hold the tape head in place, in a manner which prevents any distortion from the desired aligned position as the potting material dries. Further, the pivotal adjustment arrangement permits the installer to easily and accurately adjust the azimuth angle of the head, for even extremely tight tolerances.

In the foregoing description, it will be readily appreciated by those skilled in the art that many modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows.

1. An arrangement for mounting magnetic tape heads and the like, comprising:
   a mounting plate adapted for fixedly attaching a magnetic tape head therewith, and including first and second side edges;
   a housing having a base and first and second upstanding sidewalls between which said first and second mounting plate side edges are respectively received;
   means for pivotally supporting said mounting plate on said housing base for pivotal motion thereon;
   means for adjusting the angular orientation of said mounting plate to an aligned position, wherein the magnetic head assumes a predetermined relationship with respect to a magnetic tape sliding thereover;
   first and second channels positioned in said first and second mounting plate side edges and housing sidewalls respectively, and extending therealong to an end of one of said mounting plate and said housing sidewalls; and
   a solidifying plastic material injected into said first and second channels from said end, said material being curable to form first and second keys in said first and second channels which positively interconnect said mounting plate and said housing in the aligned position.

2. An arrangement as set forth in claim 1, wherein said pivotal supporting means comprises:
   a rib disposed between said mounting plate and said housing base, and extending longitudinally along a medial portion thereof to form a fulcrum on which said mounting plate pivots.

3. An arrangement as set forth in claim 2, wherein said adjusting means comprises:
   resilient means engaging one side of said mounting plate and urging the same rotatably about said rib in one direction; and
   an adjustable stop engaging the other side of the mounting plate and retaining the same in a selected position against the force of said resilient means.

4. An arrangement as set forth in claim 3, wherein:
   said adjustable stop includes means for expanding and retracting the same to pivot said mounting plate about said rib.

5. An arrangement as set forth in claim 4, wherein:
   said adjustable stop comprises a threaded stud.

6. An arrangement as set forth in claims 3 or 5, wherein:
   said resilient means comprises a leaf spring.

7. An arrangement as set forth in claim 1, wherein:
   said channels each have an open end and a closed end.

8. An arrangement as set forth in claim 7, wherein:
   said channels are each tapered inwardly from the open end to the closed end to facilitate injection of the plastic material therein.

9. An arrangement as set forth in claim 8, wherein:
   said channel open ends are frustoconical in shape.

10. An arrangement as set forth in claim 9, wherein:
    said channel open ends are disposed at a forward end of said mounting plate.

11. An arrangement as set forth in claim 3, wherein:
    said resilient means comprises a leaf spring having opposing side edges between which said leaf spring is bowed;
    said mounting plate includes a V-shaped groove in which one of said leaf spring side edges is retained.

12. An arrangement as set forth in claim 11, wherein:
    the one of said housing sidewalls disposed adjacent said mounting plate one side includes a notch in which the other of said leaf spring side edges is retained.

13. An arrangement as set forth in claim 12, wherein:
    said leaf spring is bowed outwardly away from said one housing sidewall.

14. An arrangement as set forth in claim 13, wherein:
    said one housing sidewall includes an outwardly protruding lug at a medial portion thereof to positively prevent said leaf spring from assuming an inwardly-bowed relationship with said one housing sidewall.

15. An arrangement as set forth in claim 1, wherein:
    said channels extend along a major portion of the respective mounting plate side edges.

16. An arrangement for mounting magnetic tape heads and the like, comprising:
    a mounting plate adapted for fixedly attaching a magnetic head therewith, and including first and second side edges;
    a housing having a base with first and second upstanding sidewalls between which said first and second mounting plate side edges are respectively received;
    means for pivotally supporting said mounting plate on said housing base to permit pivotal motion thereon;
    means for adjusting the angular orientation of the mounting plate to an aligned position, wherein the magnetic head assumes a predetermined relationship with the direction of motion of a magnetic tape sliding thereover;

a first channel positioned in at least a portion of one of said mounting plate side edges;

a second channel positioned in at least a portion of the one of said housing sidewalls disposed adjacent said one mounting plate side edge, and communicating with said first channel; one of said first and second channels extending to an end of one of said one mounting plate side edge and said one housing sidewall; and a solidifying plastic material injected into said channels from said end and hardening to form a key which positively interlocks said mounting plate and said housing in the predetermined orientation.

17. In a magnetic tape player/recorder, an arrangement for mounting a magnetic tape head therein, comprising:

a mounting plate having said magnetic tape head fixedly attached thereto, and including first and second side edges;

a housing having a base and first and second upstanding sidewalls between which said first and second base plate side edges are respectively received;

means for pivotally supporting said mounting plate on said housing base to permit pivotal motion thereon;

means for adjusting the angular orientation of said mounting plate to an aligned position, wherein said magnetic head assumes a predetermined relationship with the plane of motion of a magnetic tape sliding thereover;

first and second channels positioned in said first and second mounting plate side edges and said housing sidewalls respectively, and extending therealong to an end one of said mounting plate side edges and said housing sidewalls; and a solidifying plastic material injected into said first and second channels from said end, and curing to form first and second keys in said first and second channels which positively interconnect said mounting plate and said housing in said aligned position.

18. An apparatus as set forth in claim 17, wherein:
said predetermined relationship between said head and said plane of tape motion comprises substantially perpendicularity of the vertical axis of the head with respect to the axis of longitudinal tape motion.

19. An apparatus as set forth in claim 17, wherein:
said keys are substantially rigid.

20. An apparatus as set forth in claim 17, wherein:
said magnetic tape head extends outwardly of a forwardmost edge of said mounting plate.

21. An arrangement for mounting magnetic tape heads and the like, comprising:

a mounting plate adapted for fixedly attaching a magnetic tape head therewith;

a housing having a base with upstanding sidewalls between which opposing side edges of said mounting plate are received;

means for pivotally supporting said mounting plate on said housing base to permit pivotal motion thereon, and comprising a support disposed between said mounting plate and said housing plate, and extending along a medial portion thereof to form a fulcrum on which said mounting plate pivots;

means for adjusting the angular orientation of said mounting plate to an aligned position wherein the magnetic tape head assumes a predetermined relationship with the plane of motion of a magnetic tape sliding thereover; said adjusting means comprising:

resilient means engaging one side of said mounting plate and rotatably urging the same in one direction; and an adjustable stop engaging the other side of said mounting plate and retaining the same in a selected position against the force of said resilient means.

22. An arrangement as set forth in claim 21, wherein said pivotal supporting means comprises:
a rib connected with one of said mounting plate and said housing base.

23. An arrangement as set forth in claim 22, wherein:
said resilient means comprises a leaf spring; and
said adjustable stop includes a threaded member.

24. An arrangement as set forth in claim 23, wherein:
said mounting plate includes a groove adjacent said one side edge in which one leaf spring side edge is retained;

said housing sidewall disposed adjacent said mounting plate one side includes a groove in which the other side edge of said leaf spring is retained; and said leaf spring is bowed outwardly away from said notched housing sidewall, thereby urging said mounting plate other side edge into abutment with the adjacent housing sidewall to laterally align said tape head.

25. A method for mounting a magnetic tape head in a magnetic tape player/recorder, comprising:

providing a mounting plate on which said magnetic head is fixedly attached; said mounting plate including opposing side edges;

providing a housing portion of said player/recorder which includes a base on which said mounting plate is supported for pivotal motion, and upstanding housing sidewalls between which the side edges of said mounting plate are received;

forming channels in the side edges of said mounting plate and said adjacent sidewalls of the housing, and extending said channels therealong to one end of one of said mounting plate and said housing;

adjusting the angular orientation of said mounting plate to an aligned position, wherein the magnetic tape head assumes a particular desired relationship with respect to the magnetic tape;

temporarily retaining the magnetic tape head in said aligned position;

injecting a solidifying plastic material into said channels; and curing said plastic material to a solid state to form rigid keys in said channels which positively interconnect said mounting plate and said housing along both sides thereof for securely and permanently retaining said magnetic tape head in the aligned position.

26. A method as set forth in claim 25, wherein said injecting step comprises:

using a syringe containing the plastic material;
inserting a needle portion of the syringe sequentially into an open end of the channels to a medial location disposed between the open end and a closed end of the channel; and ejecting the plastic material from the syringe into the channels, whereby the plastic materials fills the channels from the closed end to the open end thereof.

27. A method as set forth in claim 25, wherein said adjusting step comprises rotating a threaded member.

* * * * *